(12) United States Patent
Braun

(10) Patent No.: US 6,349,214 B1
(45) Date of Patent: *Feb. 19, 2002

(54) SYNCHRONIZATION OF BROADCAST FACILITIES VIA SATELLITE

(76) Inventor: Warren L. Braun, 680 New York Ave., Harrisonburg, VA (US) 22801

( * ) Notice: Subject to any disclaimer, the term of this patent is extended or adjusted under 35 U.S.C. 154(b) by 0 days.

This patent is subject to a terminal disclaimer.

(21) Appl. No.: 09/316,036

(22) Filed: May 21, 1999

(51) Int. Cl.[7] ................................................ H04B 7/01
(52) U.S. Cl. ..................... 455/502; 455/12.1; 455/13.1; 455/13.2; 455/503; 455/112; 455/119
(58) Field of Search ............................ 455/12.1, 13.1, 455/13.2, 502, 11.1, 503, 16, 17, 112, 3.01, 3.02; 375/356; 370/319, 324, 343, 350, 525, 526

(56) References Cited

U.S. PATENT DOCUMENTS

| | | |
|---|---|---|
| 3,221,329 A | 11/1965 | Stowell |
| 3,263,230 A | 7/1966 | Greenberg |
| 3,550,002 A | 12/1970 | Shostak et al. |
| 3,742,498 A | 6/1973 | Dunn |
| 3,982,075 A | 9/1976 | Jefferis et al. |
| 4,004,098 A | 1/1977 | Shimsaki |
| 4,100,499 A | 7/1978 | Monrolin |
| 4,574,379 A | 3/1986 | Eng et al. |
| 4,577,316 A | 3/1986 | Schiff |
| 4,630,267 A | 12/1986 | Costes et al. |
| 4,688,216 A | 8/1987 | Saburi |
| 5,066,957 A | 11/1991 | Mizuno et al. |
| 5,216,717 A * | 6/1993 | Bourcet et al. ............... 381/3 |
| RE34,540 E * | 2/1994 | Wu et al. ...................... 455/20 |
| 5,360,784 A | 11/1994 | Nelson |
| 5,394,561 A | 2/1995 | Freeburg |
| 5,410,731 A | 4/1995 | Rouffet et al. |
| 5,423,058 A * | 6/1995 | Cudak et al. ............... 455/503 |
| 5,584,046 A | 12/1996 | Martinez et al. |
| 5,629,649 A | 5/1997 | Ujiie |
| 5,790,939 A | 8/1998 | Malcolm et al. |
| 5,864,579 A | 1/1999 | Briskman |
| 6,011,977 A * | 1/2000 | Brown et al. ............... 455/503 |
| 6,041,088 A | 3/2000 | McCallister |

* cited by examiner

Primary Examiner—Nay Maung
Assistant Examiner—Temica M. Davis
(74) Attorney, Agent, or Firm—Whitham, Curtis & Christofferson, P.C.

(57) ABSTRACT

Interference effects between television transmitters for amplitude modulated or digital video and operating on a common allocated channel or frequency is avoided while discrimination is improved by synchronizing carrier signals for a plurality of transmitters. Booster transmitters for correcting coverage anomalies can operate of the same channel or frequency rather than requiring a different channel or frequency presently required in translators; making all allocable channels available for diverse broadcast programming. Discrimination between transmitters operating on the same channel or frequency but with potentially differing programming can be achieved with directional antennas. Synchronization of carrier signals is achieved by frequency multiplication of a tone relayed over a satellite transmission channel by an integral power of two using one or more serially connected full-wave rectifier stages and tuned filters.

14 Claims, 2 Drawing Sheets

SYNCHRONIZATION OF BROADCAST FACILITIES VIA SATELLITE

BACKGROUND OF THE INVENTION

1. Field of the Invention

The present invention generally relates to broadcast communication such as amplitude or pulse modulation radio and television and, more particularly, to broadcast carrier frequency usage and synchronization, particularly for translators used for local broadcast coverage.

2. Description of the Prior Art

Broadcast communications have become an important and rapidly growing industry. During the past few years, many new frequencies and channels have been allocated to provide an increased variety of programming. Many new broadcast stations have also been recently established to improve broadcast coverage to more remote receiver locations. However, coverage has not yet become complete in the United States, in large part due to mountain ranges and the fact that FM radio and television frequencies are not reflected from upper layers of the atmosphere and thus require substantially a line-of-sight transmission path for reliable communications to be carried out. Even in urban areas, some locations will be able to achieve only marginal reception due to reflections from buildings, aircraft and the like causing so-called multi-path distortion and signal cancellation.

Of course, different programming cannot be broadcast on the same channel or frequency if the transmission patterns overlap since a receiver in a region of such overlap could not easily reject either signal. For this reason, at the present time, the transmission pattern of broadcast transmitters may require modification with specially designed antenna arrays. Further, broadcast transmitters using the same channel or frequency are not permitted within one hundred seventy miles of each other and transmission power is closely regulated. Further, the carrier frequencies of respective transmitters in a triad (a group of three transmitters using a frequency or channel which is nominally the same and which are most proximate to each other) are offset from each other by 10 KHz or 20 KHz under present frequency allocation regulations of the Federal Communications Commission to facilitate discrimination. However, when coverage overlaps, beating of carriers may seriously degrade reception of either signal.

It is customary at the present time to deal with areas of poor coverage within the allocated broadcast pattern of broadcast stations by the use of so-called translators functioning as a relay station. A translator is essentially a strategically located slave transmitter which receives a broadcast signal on one or more frequencies or channels and provides retransmission on other frequencies or channels. The term translator derives from the function of translating the modulation of a received signal to a different carrier signal. For the reasons discussed in the preceding paragraph, the frequencies or channels on which broadcast signals are received cannot be used for retransmission since interference with one or more of the original broadcast signals would otherwise result. The translators which may be used are also subject to regulations as to minimum geographical separation, transmission pattern and frequency offset as broadcast stations. As an additional complicating factor, frequency allocation regulations allow deviation of carrier frequency of broadcast transmitters 50 Hz above or below a nominal carrier frequency.

The overall effect of the above-described circumstances is to favor usage of a substantial fraction of the available frequencies and channels for enhancement of coverage pattern of broadcast stations rather than to provide the variety of programming which might otherwise be possible. Further, even though many marginal reception areas are serviced by translators, the frequency offsets described above reduce the signal strength. That is, discrimination would be increased by 11 db if frequency offsets were not employed.

It should also be recognized that the same problems, while substantially less severe, are also present for amplitude modulated signals at much lower frequencies for which a line-of-sight transmission path is not as critical. Nevertheless, amplitude or pulse modulated signals are much more subject to interference and noise as well as exhibiting areas of poor broadcast signal coverage.

Accordingly, the frequency allocation arrangement currently in use, while based on sound technical requirements, tends to diminish signal quality and limit the number of channels which can be used in any given geographical area. This, in turn, limits the amount of information which can be concurrently communicated at a time when frequency allocations are at a premium and demand for access to information and programming variety are rapidly increasing.

SUMMARY OF THE INVENTION

It is therefore an object of the present invention to provide an inexpensive system for synchronizing broadcast facilities to avoid the need for frequency offsets and the need for use of different frequencies by relay station translators.

It is another object of the invention to provide for enhancement of broadcast signals consistent with the avoidance of interference between broadcast signals.

It is a further object of the invention to provide for full utilization of channel allocations in support of diversity of programming.

It is yet another object of the invention to provide, at low cost, a system permitting effective directional discrimination, if permitted, between stations broadcasting on a common frequency.

In order to accomplish these and other objects of the invention, a method of synchronizing a plurality of broadcast transmitters is provided, including steps of relaying a synchronization tone to a plurality of transmitters by satellite, multiplying the frequency of the synchronization tone to obtain a desired carrier frequency at each of the plurality of transmitters, and modulating the carrier frequency simultaneously at the plurality of broadcast transmitters with a modulation signal.

In accordance with another aspect of the invention, a broadcast transmitter system is provided including a plurality of transmitters having a common allocated channel or nominal carrier frequency, each respective transmitter including a receiver for receiving a tone transmitted from a satellite, a frequency multiplier, preferably formed of one or more full-wave rectifier stages and tuned filters, for multiplying the frequency of the tone to derive a carrier frequency, and a modulator for modulating the carrier frequency with a broadcast signal.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
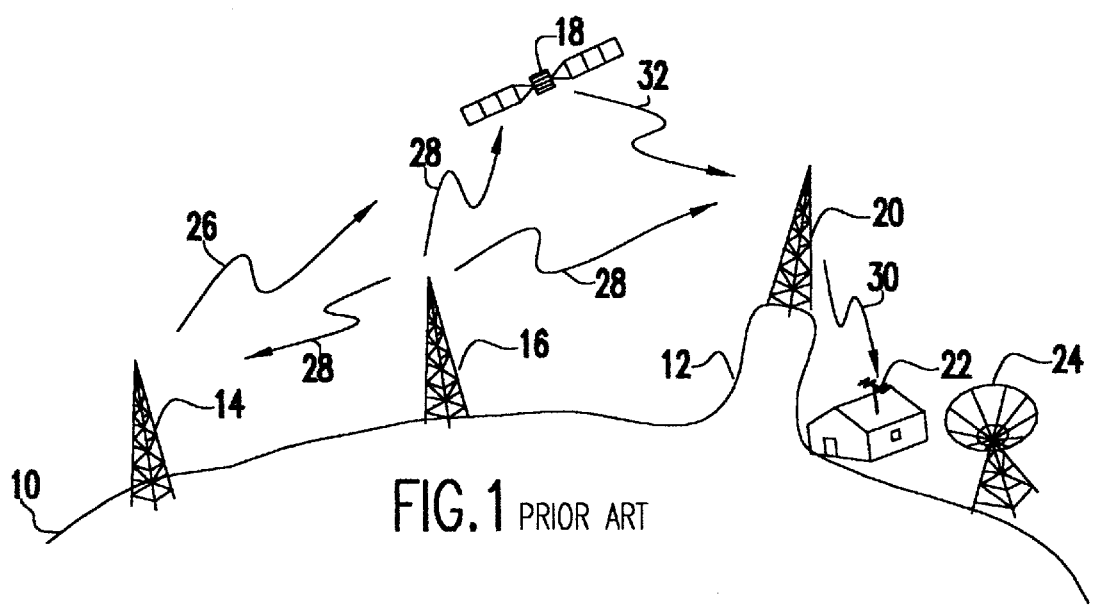
FIG. 1 is a highly schematic diagram illustrating a generalized geographic environment of broadcast transmissions as currently conducted.
Figure 2:
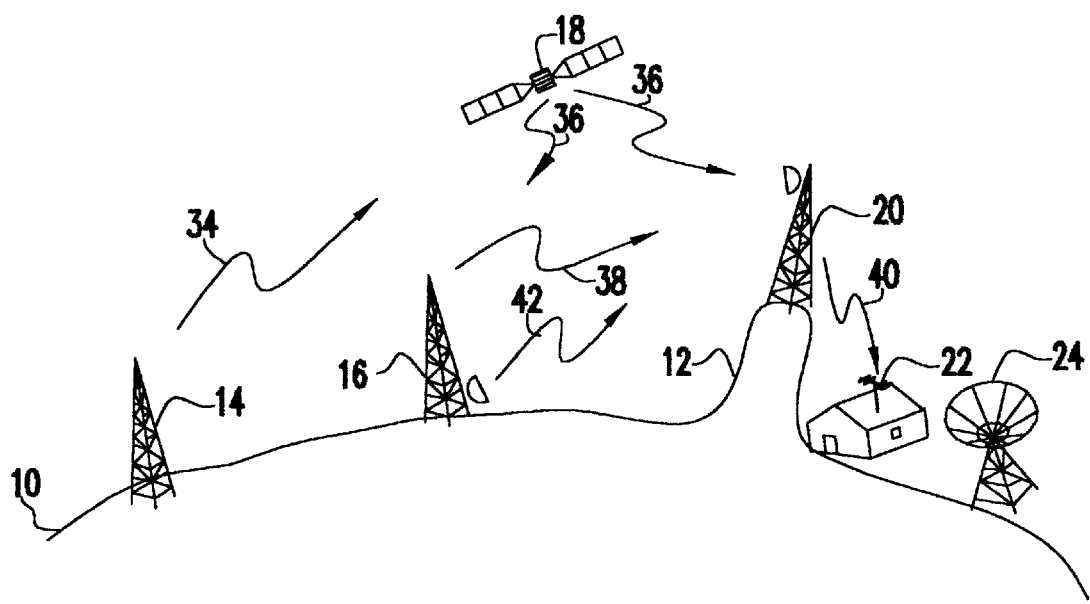
FIG. 2 is a highly schematic diagram illustrating a generalized geographic environment of the invention and the deployment of the system in accordance with the invention in that environment.

Referring now to the drawings, and more particularly to FIGS. 1 and 2, there is shown, in highly schematic form, a generalized geographical environment of broadcast transmissions as presently conducted and as conducted in accordance with the invention, respectively. It should be understood that terrain 10 of the earth's surface is essentially arbitrary and a single obstruction to a line-of-sight transmission path is depicted as a mountain 12 for simplicity. It should also be appreciated that the major hardware facilities of the transmission environment of FIGS. 1 and 2 are not only depicted identically (at the level of abstraction provided by these Figures) for clarity but illustrate that no major alteration thereof is required in order to implement the invention and provide the particular signal paths for particular signals illustrated in FIG. 2.

In the generalized environment depicted, transmitter 14 represents an up-link 26 to satellite 18. Transmitter 16 is a broadcast transmitter broadcasting a modulated signal on a given channel (e.g. channel 3) and which can also provide an up-link to satellite 18 and or broadcast a signal to up-link transmitter 14 for transmission to satellite 18. Transmitter 20 represents a translator which receives the broadcast signal from transmitter 16 and rebroadcasts the same signal on a different channel (e.g. channel 56) from the channel on which the signal was received.

A customer may thus receive a broadcast signal 30 (on a translated channel or frequency) from translator 20 through antenna 22 or from direct satellite transmission 32 from satellite 18 through antenna 24 (and decoder, if used). In the absence of an obstruction 12 to a line-of-sight transmission path, the customer could also receive the broadcast signal from transmitter 16 on the original channel or frequency. Therefore, there are, in this example (as is generally the case at the present time), redundant sources for a broadcast signal and the source providing the qualitatively better or best signal can be chosen by the customer by means of the directionality of antennas 22, 24 or a choice therebetween.

It should also be appreciated that the broadcast environment illustrated in FIGS. 1 and 2 is very much simplified to include only a single broadcast signal (although the up-link transmitter 14 and satellite 18 could be handling many more signals for many diverse purposes such as geo-location, telecommunications, and the like). In practice, for most customer locations, numerous transmitters 16 and, possibly, numerous translators 20 will be present. Similarly, several satellites 18 may provide a signal source for a relatively large number of broadcast signals of numerous broadcast channels. Therefore, the present broadcast environment uses a large portion of the satellite bandwidth for respective broadcast signals. Similarly, the geographic locations and potentially overlapping coverage patterns use a large portion of the available frequency or channel allocations to minimize potential interference and to improve coverage with translators 20.

Referring now to FIG. 2, the operation of the invention in the same broadcast environment will be explained. Fundamentally, it should be understood that synchronized modulation of synchronized carriers cannot produce interference even if multiple signal paths provide signals to a receiver. Therefore, the invention seeks to synchronize the carrier and modulation of all transmitters broadcasting on a given channel or carrier frequency over an arbitrary geographical area which may vary in extent from current coverage patterns (including the coverage patterns of translators) to world-wide.

For purposes of the invention, up-link transmitter 14 need only transmit (34) a number of modulation tone signals, as will be discussed below, which are relayed to transmitter 16' and translator/booster 20', as indicated by reference numeral 36. However, broadcast programming could continue to be transmitted and relayed in the manner described above to maintain satellite 18 as a redundant source of such signals. The tones received at transmitters 16' and 20' will thus be the same and are necessarily synchronized but for a slight potential phase delay which is unimportant to the principles or practice of the invention. Any drift of the original tone(s) will be exactly the same at all locations and will be synchronized wherever received.

The basic principle of the invention is to derive synchronized carrier signals at a plurality of transmitter and/or translator/booster locations from the modulation tones 36 received from satellite 18. (Since the hardware functioning as a translator 20 in FIG. 1 would thus be transmitting a carrier signal synchronized with the carrier of transmitter 16, there is no "translating" function performed and "slave" transmitter 20' is more properly referred to as a booster, as will be done hereinafter.) Booster 20' can thus receive a modulation signal from transmitter 16' (preferably over a microwave link 42 since the broadcast signal cannot be received on the same channel or frequency on which the booster 20' will transmit) and provide a modulated carrier signal of increased signal strength to customer antenna 22 precisely in synchronism with the modulated carrier signal transmitted by transmitter 16'. Since these signals are synchronized, they cannot interfere with each other. The signal strength is the sum of the signal components from transmitter 16' and booster 20' reaching antenna 22.

Figure 3:
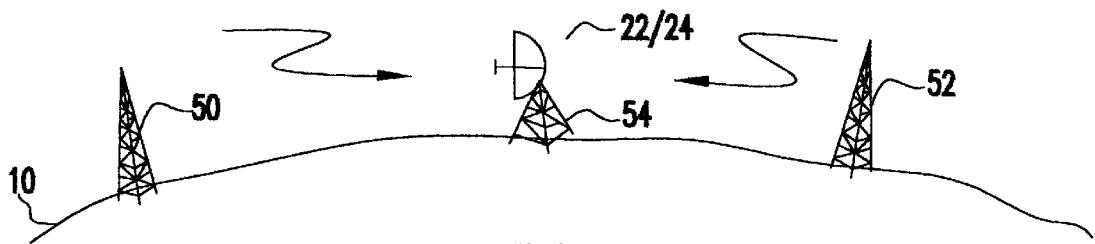
FIG. 3 is a highly schematic alternative broadcast environment illustrating a feature of the invention.

Referring now to FIG. 3, a feature of the invention which may effectively increase the number of available broadcast signals will now be explained. It was noted above that practical broadcast environments will include a plurality of transmitters broadcasting different modulation signals on different channels or carrier frequencies. It was also noted above, that in prior arrangements, the translator 20 would necessarily use a channel or frequency different from the channel or frequency of transmitter 16; effectively reducing the number of broadcast channels available for distinct broadcast programming for any given local geographic area. It should also be apparent from the above discussion of the invention in connection with FIG. 2, that since the invention allows the transmitter 16' and its associated boosters 20' to operate on the same channel or frequency and avoids the need for frequency offsets, the full number of channels technically feasible for required modulation signal bandwidths can be used for different programming on respective channels or even the same channel.

While it is preferred to implement the invention in a manner where programming on a given channel is the same world-wide or at least over very large areas, it is possible to have different programming on the same channel in some locations, if permitted (e.g. by FCC regulations). As shown in FIG. 3, transmitters 50 and 52 are assumed to be broadcasting different programming on the same, synchronized, channel or frequency. It is further assumed that customer receiver 54 is well within the coverage pattern of both transmitters 50 and 52. Under these circumstances and with the carriers of both transmitters 50, 52 synchronized, there will be no beating effects between the carriers and the signals can be independently received if the front-to-back gain ratio of the directional antenna 24 significantly exceeds the difference in signal strengths of signals from the respective transmitters.

It should also be recognized that the broadcast environment depicted in FIG. 3 represents an early stage of the preferred implementation of the invention for one transmitter but not necessarily other transmitters in a triad and which may or may not continue to utilize current frequency offsets. If the invention was applied to only one of transmitters 50, 52, (as would be the case in an early stage of implementation of the invention) this effect would, potentially, be somewhat enhanced by employing frequency offsets in the current manner although beating of carriers would be possible.

It can seen that the invention thus provides for not only full channel or frequency usage for different programming on respective channels (since no channel allocations need be allocated to translators 20) but, in some cases, can provide even more programming diversity beyond the number of available channels. Likewise, while it is preferred that the invention be employed worldwide using existing transmitters and translators/boosters, it is seen that the invention can be employed locally and is fully compatible with gradual implementation while providing improved discrimination.

Figure 4:
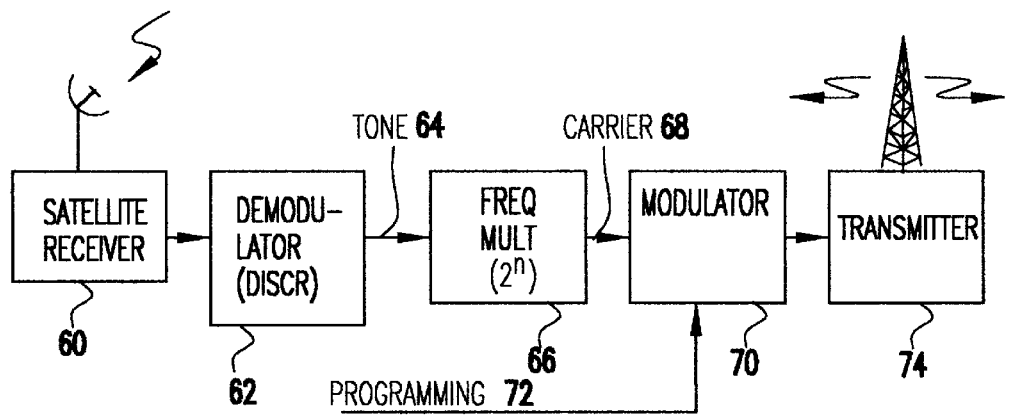
FIG. 4 is a schematic diagram of a broadcast transmitter or translator/booster in accordance with the invention.

Having demonstrated the potential of the invention above, a preferred, low-cost and convenient technique of implementing a broadcast system will now be discussed in connection with FIGS. 4 and 5. Specifically, with reference to FIG. 4, the transmission from satellite 18 including a fixed frequency tone is received at local receiver 60 and demodulated at 62 to produce the original tone 64 transmitted from up-link transmitter 14. The frequency of the tone 64 is then multiplied at 66, preferably by an integral power of two, to produce the desired carrier frequency 68 which is modulated at modulator 70 with a desired programming signal and transmitted at transmitter 74. It should be appreciated that the same signal processing elements shown in FIG. 4 are provided in both transmitters 16' and boosters 20'.

While, in theory, the invention can be practiced using other frequency multiples (e.g. three, five, seven, etc.) multiples of integral powers of two are much preferred provide for minimal hardware cost while having the additional benefit that the original tone signal remains in the carrier signal and thus more reliably locks the carrier frequencies together in synchronism. In contrast, if other multiples are employed, a phase locked loop of other signal synthesis arrangement with frequency control which merely racks the tone signal must be employed. For example, even though substantial drift of the tone may occur, the carrier frequencies derived therefrom will remain precisely locked together if an integral power of two multiple is employed while, if other multiples are used, tracking frequency drift may or may not be accomplished and significant variation in phase may be engendered while doing so.

It should also be appreciated that boosters 20' and transmitter 16' differ principally by the location where the modulating signal 72 is initially provided and, possibly (and largely by convention) transmission power and antenna array to define the basic coverage pattern. However, this latter potential distinction is of diminishing importance as the invention is implemented over larger geographic areas with common programming for transmitters operating on a given frequency or channel. That is, as common programming is transmitted synchronously by a plurality of transmitters 16', the function of all transmitters other than the originating transmitter parallels that of boosters 20' which are allocated to avoiding coverage pattern anomalies.

Thus, all transmitters developing the same carrier frequency from the satellite transmission tone will be synchronized and will remain synchronized even if the frequency of the tone drifts from the nominal frequency. Plural carriers at different frequencies can be synchronized by multiplying by different powers of two. However, such frequencies would also be harmonics and derivation of such plural carrier frequencies in such a manner is not preferred unless widely separated. The frequency of the tone transmitted to and relayed by satellite 18 is chosen in view of the carrier frequency to be derived and is a power of two sub-multiple of the desired carrier frequency. The power-of-two sub-multiple can be freely chosen as long as the tone remains within the satellite transmission link bandwidth (currently 25 MHz).

For example, the carrier frequency for channel 3 is 61.25 MHz. Division of this frequency by 16 ($2^5$) yields a tone frequency of approximately 3.9 MHz which corresponds to the satellite transmission bandwidth. Similarly, the carrier frequency for channel 13 is 211.25 MHz. Division of this frequency by 64 ($2^7$) yields a tone frequency of approximately 4.9 MHz which also corresponds to the satellite transmission bandwidth. Any desired carrier frequency can thus be generated by appropriate choice of tone and power of two sub-multiple and corresponding power of two multiplier.

While it is preferred and the invention most simply and economically implemented by using a separate satellite channel for each tone used to synchronize transmitters on a given broadcast channel, plural tones can be relayed on a single satellite channel. A frequency difference between tones of 5% to 10% is entirely sufficient for discrimination of tones for synchronizing different channels at the present level of skill in the art and at reasonable cost.

As a practical matter, such a frequency difference can always be achieved in regard to any particular pair of tones because the choice of multiplier is very flexible within a relatively wide bandwidth of a satellite channel. The details of the receiver and tone discrimination apparatus are otherwise unimportant to the practice of the invention and suitable arrangements will be evident to those skilled in the art.

Figure 5:
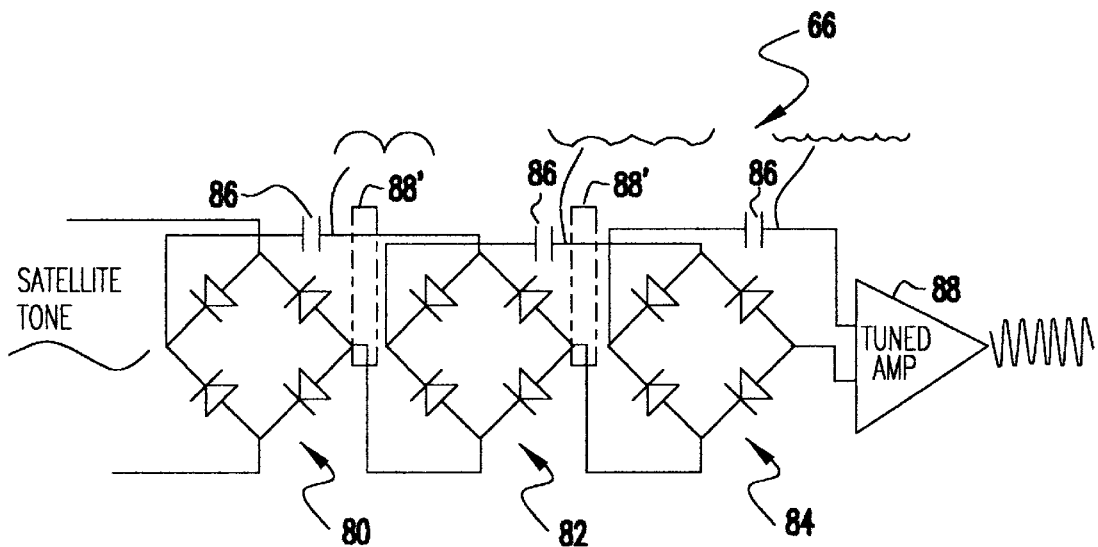
FIG. 5 is a schematic diagram of a representative portion of a frequency multiplying arrangement in accordance with a preferred embodiment of the invention, included in the schematic diagram of FIG. 3 and by which broadcast transmitters are synchronized in accordance with the invention.

Referring now to FIG. 5, a representative portion of a power of two multiplier is shown corresponding to a frequency multiple of eight and having three frequency doubler stages 80, 82, 84. The preferred frequency doubler stage is simply a full-wave rectifier circuit. Preferably, DC blocking capacitors 86 are provided between all frequency doubler stages and tuned amplifiers such as 88 (or schematically indicated as 88') are provided between all stages (e.g. 88') or periodically (e.g. 88) to remove harmonics at the frequency provided by the preceding frequency doubler stage. As is well-understood in the art, tuned amplifiers perform a filtering function at a particular frequency as well as providing gain to maintain a desired amplitude as the signal is rectified.

The expedient of using a full-wave rectifier for the respective frequency doubler stages is particularly inexpensive and readily available commercially. It should be further noted that no arrangement for frequency locking is necessary or desirable since drift is of very little or no consequence when synchronization is maintained and any frequency locking arrangement would, at the very least, compromise synchronization, as discussed above in regard to frequency multiples that are other than integral powers of two.

In view of the foregoing, it is readily seen that the invention provides an inexpensive and easily implemented arrangement for synchronizing plural transmitters operating on any of a large plurality of channels or carrier frequencies. The invention is particularly applicable to both amplitude modulated video and digital video as well as other signals which do not employ carrier frequency modulation. By so synchronizing carrier signals for respective channels and/or allocated frequencies, the use of offsets and translation to other frequencies or channels to avoid broadcast coverage anomalies is avoided and the full number of allocable channels or frequencies is made available for independent broadcast programming while increasing available signal strength and avoiding interference, carrier beating and other deleterious effects on signal reception.

Further, by the use of the invention, the need for direct satellite signal reception of programming is much reduced but can be provided compatibly with the invention, as desired. That is, full broadcast coverage may be achieved by booster transmitters (provided, for example, by simple and inexpensive conversion of existing translators) and there is thus no need to rely on satellite relay transmissions to overcome obstacles to line-of-sight transmission paths since there is no trade-off between the number of booster transmitters employed and the number of channels available for independent programming. By the same token, since only synchronization tones need be relayed by satellite, more satellite relay capacity can be allocated to other purposes.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of synchronizing a plurality of broadcast transmitters, including steps of relaying a synchronization tone to said plurality of transmitters by satellite, multiplying a frequency of said synchronization tone to obtain a desired carrier frequency at each of said plurality of transmitters, and modulating said carrier frequency simultaneously at said plurality of broadcast transmitters with a modulation signal.

2. A method as recited in claim 1, including the further step of deriving said modulation signal at one of said plurality of transmitters from a signal provided by another of said plurality of transmitters.

3. A method as recited in claim 2, wherein said modulation signal is derived from a signal transmitted to said one of said plurality of transmitters by a microwave link from said another of said plurality of transmitters.

4. A method as recited in claim 1, wherein said multiplying step includes the step of multiplying said synchronization tone by a factor of two in each of a plurality of stages.

5. A method as recited in claim 1, including the further step of computing a frequency of said synchronization tone by dividing a desired carrier frequency by an integral power of two.

6. A method as recited in claim 1, including the further step of discriminating reception between signals of respective broadcast transmitters having a common allocated channel or frequency with a directional antenna.

7. A broadcast transmitter system including a plurality of transmitters having a common allocated channel or nominal carrier frequency, each respective transmitter of said plurality of transmitters including
means for receiving a tone having a frequency transmitted from a satellite to each of said plurality of transmitters,
means for multiplying said frequency of said tone to derive a carrier frequency, and
means for modulating said carrier frequency with a broadcast signal.

8. A system as recited in claim 7, wherein said broadcast signal is derived from a signal received over a microwave link.

9. A system as recited in claim 7, wherein said means for multiplying said frequency of said tone includes a full-wave rectifier.

10. A system as recited in claim 9, wherein said means for multiplying said frequency of said tone further includes a tuned amplifier.

11. A system as recited in claim 7, further including means for transmitting said tone to said satellite.

12. A system as recited in claim 11, wherein a single tone is transmitted on a satellite relay channel.

13. A system as recited in claim 11, wherein a plurality of tones are transmitted on a satellite relay channel and said means for receiving a tone includes a discriminator for discriminating one of said plurality of tones.

14. A system as recited in claim 7, wherein a common broadcast signal is used to modulate said carrier signal in each of said plurality of transmitters.

* * * * *